E. F. AYCOCK.
PROCESS OF MAKING TIRE FILLERS.
APPLICATION FILED SEPT. 27, 1918.

1,315,652.

Patented Sept. 9, 1919.

WITNESSES:

INVENTOR.
E. F. Aycock,
BY
ATTORNEY.

UNITED STATES PATENT OFFICE.

EDWARD F. AYCOCK, OF MIDLOTHIAN, TEXAS.

PROCESS OF MAKING TIRE-FILLERS.

1,315,652.     Specification of Letters Patent.     Patented Sept. 9, 1919.

Application filed September 27, 1918. Serial No. 255,988.

*To all whom it may concern:*

Be it known that I, EDWARD F. AYCOCK, a citizen of the United States, residing at Midlothian, in the county of Ellis and State of Texas, have invented certain new and useful Improvements in Processes of Making Tire-Fillers, of which the following is a specification.

This invention relates to fillers for tire casings and the process of producing the same.

On May 26th, 1914, Patent No. 1,097,824 was issued to Claude S. Staten for a resilient filler for elastic vehicle tires. This patent covers a filler formed of small elastic particles bonded together but having air chambers between the particles. This filler has been manufactured for some time, but is open to certain objections such as deterioration, disintegration and loss of elasticity.

I have discovered certain improvements in the production of a resilient filler and have evolved a process which has made the same a commercial success. I produce a filler in which the voids or air chambers are reduced to a minimum and a more solid and compact filler produced. Experience shows my filler to be superior, that it will last longer, retains a higher degree of elasticity, does not disintegrate and will hold its shape. In carrying out the process I utilize yieldable or resilient material and have obtained good results by using discarded or worn out inner tubes, as this gives a grade of rubber which is highly efficient. The rubber material is ground or cut up into small pieces and mixed with a compound composed of rubber cement, gasolene and kerosene or their equivalents. The plastic mass thus produced is placed in a mold or former under pressure and allowed to remain for a period. This forms the filler into shape and permits the body to dry to a certain extent. The filler body or unit is removed from the mold and the latter cleaned and wiped dry. After this step the filler unit is replaced in the former and subjected to the usual vulcanizing process.

Figure 1:
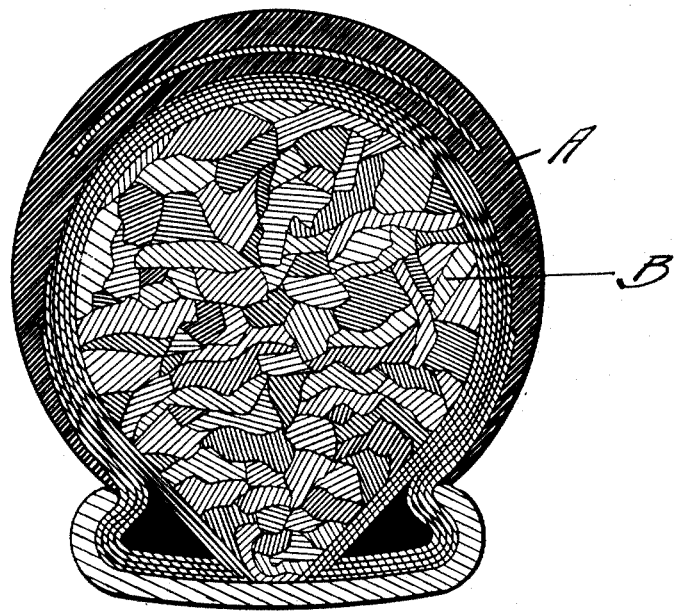
Figure 2:
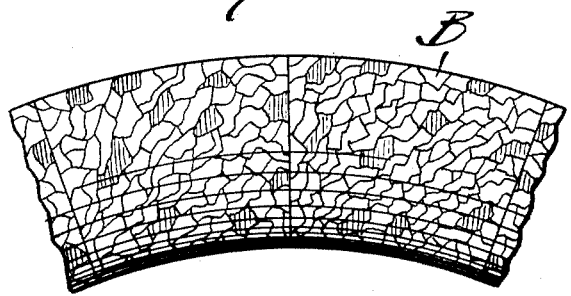

The invention will be more readily understood from a reading of the following specification and by reference to the accompanying drawings, in which an example of the invention is illustrated, and wherein Figure 1 is a transverse section through a tire having a filler constructed in accordance with this invention, and Fig. 2 is a side elevation of a segment of filler units which are inserted in the casing.

It is to be understood that this filler is a substitute for the usual inner tube of a pneumatic tire and therefore the ordinary outer casing A is employed. The filler B is made in units or sections shaped to assemble in circular form and completely fill the inner chamber of the casing. In fact the filler is somewhat compressed when in place in the casing.

In producing the filler the following process is carried out. Discarded or worn inner tubes or similar rubber material is cut up or chopped into small pieces of irregular shape. In order to unite these pieces an adhesive agent must be employed. It is also obvious that the rubber particles must be cleaned in order to make the cement adhere thereto. I have greatly reduced the labor by combining the cleaning, cementing and forming operations in a single step.

I prepare a mixture as follows:
One gallon of rubber cement,
One gallon of gasolene,
Three gallons of kerosene.

To one gallon of this mixture I add approximately sixty pounds of the rubber pieces or particles and thoroughly mix the ingredients together. All of the particles become covered with this mixture and the gasolene and kerosene act to clean and spread the surfaces of the particles so that the cement adheres thereto.

The next step consists in placing this mixture into molds or formers having the shape in which the filler units are to be produced. These molds are of ordinary semi-circular form and when brought together press the filler into shape. The filler is permitted to remain in the molds or formers for a period of hours which may vary according to conditions. I have found that a period of twelve hours is sufficient but do not care to be limited to this time. After the filler has been in the formers for the required period it is removed. The rubber cement will have set to a certain extent and a certain evaporation of the oils will have taken place thus leaving the units more or less solid and readily handled. The insides of the formers are cleaned and wiped dry and sprinkled with a suitable powder such as soapstone or the like after which the units are replaced.

The next step consists in vulcanizing which is carried out under any of the well known methods, although it is preferable to employ the steam vulcanizing process. The duration of the vulcanizing period depends upon the density which is desired for the filler. For ordinary commercial use I have found an hour and twenty minutes to produce good results, but this time may be varied. After the units are vulcanized they are removed from the formers and are ready for use. The units are placed in the tire casing in successive circumferential order and the casing fastened on the rim. It is preferable to make the units of such transverse area that they will be compressed when the tire casing is fastened on the rim.

By observing the drawings it will be seen that the small particles of rubber in the filler B lie in various directions but are in close contact. This is particularly true of the outer surface. In the Staten filler there were considerable voids or air chambers both through the filler and in the outer surface and it lacked the solidity of my filler which at the same time possesses as much if not more resiliency. By employing gasolene and kerosene as I do a better bond is obtained between the particles and the filler does not lose its shape. A comparison of the filler made under the Staten patent and that made under this process makes the difference evident.

What I claim is:—

1. That process of making resilient tire fillers which consists in taking small particles of resilient material and mixing the same with a rubber cement softened by gasolene and supported by a vehicle of kerosene, and compressing and vulcanizing the mass.

2. The process of producing a resilient filler for tire casings which consists in mixing small particles of soft rubber with rubber cement, gasolene and kerosene, then placing the mass in a mold and subjecting the same to pressure for a period of time, then removing the mass and cleaning the mold, and then replacing the mass and vulcanizing the same under pressure.

3. The process of producing a resilient filler for tire casings which consists in preparing a mixture approximately one-fifth rubber cement, one-fifth gasolene and three-fifths kerosene to which is added substantially sixty pounds of small rubber particles, then thoroughly mixing this mass whereby the rubber particles are coated, then placing the mass in a mold and holding the same under pressure for a period of hours, then removing the mass and cleaning the mold, then replacing the mass and vulcanizing the same under pressure according to the density desired.

In testimony whereof I affix my signature.

EDWARD F. AYCOCK.